United States Patent
Harada et al.

(10) Patent No.: US 12,457,613 B2
(45) Date of Patent: Oct. 28, 2025

(54) TERMINAL, BASE STATION, AND COMMUNICATION METHOD TO SUPPORT SCHEDULING OF CELLS WITH SINGLE CONTROL INFORMATION

(71) Applicant: NTT DOCOMO, INC., Tokyo (JP)

(72) Inventors: Hiroki Harada, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 310 days.

(21) Appl. No.: 17/791,118

(22) PCT Filed: Jan. 10, 2020

(86) PCT No.: PCT/JP2020/000767
§ 371 (c)(1),
(2) Date: Jul. 6, 2022

(87) PCT Pub. No.: WO2021/140673
PCT Pub. Date: Jul. 15, 2021

(65) Prior Publication Data
US 2023/0044495 A1    Feb. 9, 2023

(51) Int. Cl.
*H04W 72/23* (2023.01)
*H04W 72/1273* (2023.01)
*H04W 72/50* (2023.01)

(52) U.S. Cl.
CPC ....... *H04W 72/23* (2023.01); *H04W 72/1273* (2013.01); *H04W 72/50* (2023.01)

(58) Field of Classification Search
CPC . H04W 72/12; H04W 72/1289; H04W 72/20; H04W 72/1263; H04W 72/1273; H04W 72/00; H04W 72/04; H04W 72/50; H04W 28/00; H04W 74/00; H04W 74/04; H04L 1/0027; H04L 41/0803
See application file for complete search history.

(56) References Cited

U.S. PATENT DOCUMENTS

| 10,149,317 B2 * | 12/2018 | Bergstr?m | H04L 5/0053 |
| 11,394,522 B2 * | 7/2022 | Pelletier | H04L 5/0053 |
| 2010/0130218 A1 * | 5/2010 | Zhang | H04W 48/12 |
| | | | 455/458 |

(Continued)

FOREIGN PATENT DOCUMENTS

| CN | 106559893 | * | 4/2017 | ........... H04L 1/1607 |
| CN | 111357234 | * | 12/2022 | ............... H04L 5/00 |
| JP | 2016-213902 A | | 12/2016 | |

OTHER PUBLICATIONS

International Search Report issued in PCT/JP2020/000767 on Jul. 14, 2020 (5 pages).

(Continued)

*Primary Examiner* — Warner Wong
(74) *Attorney, Agent, or Firm* — Osha Bergman Watanabe & Burton LLP

(57) ABSTRACT

A terminal includes: a receiving unit of receiving first information for configuring scheduling and second information for executing scheduling from a base station; and a control unit that identifies a single scheduled carrier or a plurality of scheduled carriers, based on the first information and the single second information.

6 Claims, 12 Drawing Sheets

(56) References Cited

U.S. PATENT DOCUMENTS

| | | | | |
|---|---|---|---|---|
| 2016/0007373 A1* | 1/2016 | Davydov | .............. | H04L 5/0044 |
| | | | | 370/329 |
| 2017/0195999 A1* | 7/2017 | Feng | ..................... | H04W 76/27 |
| 2017/0338918 A1* | 11/2017 | Tang | ....................... | H04L 5/001 |
| 2018/0102892 A1* | 4/2018 | Lunttila | ................ | H04L 5/0055 |
| 2018/0123769 A1* | 5/2018 | Pelletier | .................. | H04L 5/001 |
| 2021/0377996 A1* | 12/2021 | Lee | ....................... | H04W 72/23 |
| 2022/0174668 A1* | 6/2022 | Yuan | .................... | H04L 1/1812 |

OTHER PUBLICATIONS

Written Opinion of the International Searching Authority issued in PCT/JP2020/000767 on Jul. 14, 2020 (4 pages).

Ericsson; "New WID on NR Dynamic spectrum sharing (DSS)"; 3GPP TSG RAN Meeting #86, RP-193260; Sitges, Spain; Dec. 9-12, 2019 (4 pages).

3GPP TS 38.300 V15.7.0; "3rd Generation Partnership Project; Technical Specification Group Radio Access Network; NR; NR and NG-RAN Overall Description; Stage 2 (Release 15)"; Sep. 2019 (99 pages).

* cited by examiner

FIG.6

```
ServingCellConfig ::=            SEQUENCE {
                            ... ...
CrossCarrierSchedulingConfig ::= SEQUENCE {
    schedulingCellInfo               CHOICE {
        own                              SEQUENCE {
            cif-Presence                     BOOLEAN
        },
        other                            SEQUENCE {
            schedulingCellId                 ServCellIndex, e.g.CC#1
            cif-InSchedulingCell             INTEGER (1..7) e.g. 2
        }
    },
... }
```

FIG.10

```
ServingCellConfig ::=            SEQUENCE {
    ...
CrossCarrierSchedulingConfig ::=    SEQUENCE {
    schedulingCellInfo              SEQUENCE {
        own                         SEQUENCE {
            cif-Presence            BOOLEAN
        },
        other                       SEQUENCE {
            schedulingCellId        ServCellIndex,  e.g.CC#1
            cif-InSchedulingCell    INTEGER (1..7)  e.g. 2
        }
    },
    ...}
```

# TERMINAL, BASE STATION, AND COMMUNICATION METHOD TO SUPPORT SCHEDULING OF CELLS WITH SINGLE CONTROL INFORMATION

TECHNICAL FIELD

The present invention relates to a terminal and a communication method in a radio communication system.

BACKGROUND ART

In new radio (NR) (also referred to as "5G") that is the subsequent system of long term evolution (LTE), a technology satisfying a high-capacity system, a fast data transmission rate, low latency, simultaneous connection of a plurality of terminals, a low cost, power saving, and the like, as a required condition, has been discussed.

In the case of operating an NR system in the same band as that of the conventional LTE system, in order to improve a frequency utilization efficiency, discussions have been made regarding dynamic spectrum sharing (NR-DSS) for allowing the conventional LTE system and the NR system to coexist in the same band (for example, Non-Patent Document 2). In NR-DSS, for example, a resource used for transmitting a cell-specific reference signal or a control signal in the LTE system is excluded, and the signal of the NR system is transmitted by using the remaining resource.

In addition, an object of NR-DSS, for example, is to enhance a physical downlink control channel (PDCCH) for cross-carrier scheduling. As an example, a method for scheduling a physical downlink shared channel (PDSCH) or a physical uplink shared channel (PUSCH) of a primary cell or a primary secondary cell by using PDCCH of a secondary cell has been discussed. In addition, as another example, a method for scheduling PDSCH or PUSCH of a plurality of cells by using single downlink control information (DCI), through PDCCH of a primary cell, a primary secondary cell, or a secondary cell, has been discussed.

CITATION LIST

Non-Patent Document

Non-Patent Document 1: 3GPP TS 38.300 V15.7.0 (2019-09)
Non-Patent Document 2: 3GPP TSG RAN Meeting #86 RP-193260 (2019-12)

SUMMARY OF THE INVENTION

Problem to be Solved by the Invention

A method for scheduling each PDSCH in a plurality of cells by using single DCI has not been supported.

The invention has been made in view of the circumstances described above, and an object thereof is to support scheduling of a plurality of cells with single control information, in a radio communication system.

Means for Solving Problem

According to the disclosed technology, a terminal including: a receiving unit receiving first information for configuring scheduling and second information for executing scheduling from a base station; and a control unit that identifies a single scheduled carrier or a plurality of scheduled carriers, based on the first information and the single second information is provided.

Effect of the Invention

According to the disclosed technology, it is possible to support scheduling of a single cell or a plurality of cells with single control information, in a radio communication system.

BRIEF DESCRIPTION OF DRAWINGS

FIG. 6 is a diagram illustrating an information element example (1) in the embodiment of the invention;
FIG. 10 is a diagram illustrating an information element example (2) in the embodiment of the invention.

MODES FOR CARRYING OUT THE INVENTION

Hereinafter, an embodiment of the invention will be described with reference to the drawings. Note that, the embodiment described below is an example, and an embodiment to which the invention is applied is not limited to the following embodiment.

In the operation of a radio communication system of the embodiment of the invention, the conventional technology is suitably used. Here, the conventional technology, for example, is the conventional LTE, but is not limited to the conventional LTE. In addition, the term "LTE" used herein has a broad meaning including LTE-advanced and a scheme subsequent to the LTE-advanced (for example, NR), unless otherwise noted.

In addition, in the embodiment of the invention described below, terms such as a synchronization signal (SS), a primary SS (PSS), a secondary SS (SSS), a physical broadcast channel (PBCH), a physical random access channel (PRACH), a physical downlink control channel (PDCCH), a physical downlink shared channel (PDSCH), a physical uplink control channel (PUCCH), and a physical uplink shared channel (PUSCH), which are used in the conventional LTE, are used. This is for convenience of description, and signals, functions, and the like similar to the above may be referred to as other names. In addition, the terms in NR correspond to NR-SS, NR-PSS, NR-SSS, NR-PBCH, NR-PRACH, NR-PDSCH, NR-PUCCH, NR-PUSCH, and the like. Here, even in the case of a signal that is used in NR, it is not necessary to specify the signal with "NR-".

In addition, in the embodiment of the invention, a duplexing scheme may be Time Division Duplexing (TDD) scheme, may be Frequency Division Duplexing (FDD) scheme, or may be other schemes (for example, Flexible Duplexing or the like).

In addition, in the embodiment of the invention, "configuring" a radio parameter or the like may be pre-configuring a predetermined value, or may be configuring a radio parameter that is indicated by a base station 10 or a terminal 20.

Figure 1:
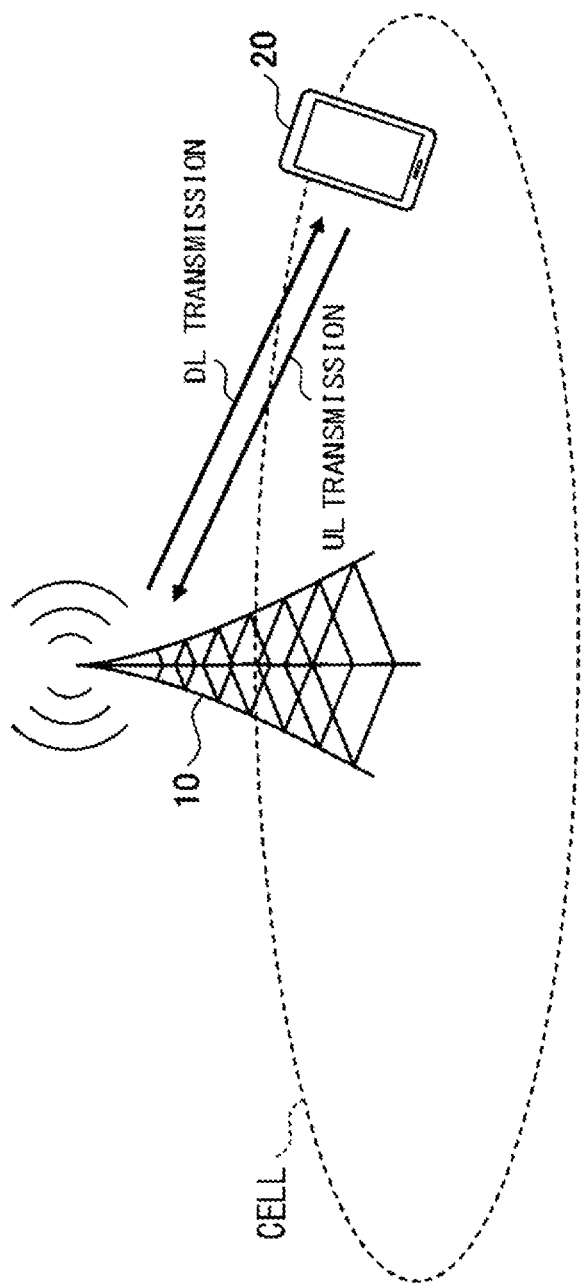
FIG. 1 is a diagram illustrating a configuration example (1) of a radio communication system in an embodiment of the invention.

FIG. 1 is a diagram illustrating a configuration example (1) of a radio communication system in the embodiment of the invention. As illustrated in FIG. 1, the radio communication system includes the base station 10 and the terminal 20. In FIG. 1, one base station 10 and one terminal 20 are illustrated, but this is an example, and a plurality of base stations 10 and a plurality of terminals 20 may be provided. Note that, the terminal 20 may be referred to as a "user equipment". In addition, the radio communication system in this embodiment may be referred to as an NR-U system.

The base station 10 is a communication unit that provides one or more cells and performs radio communication with respect to the terminal 20. A physical resource of a radio signal is defined by a time domain and a frequency domain, the time domain may be defined by a slot or an OFDM symbol, and the frequency domain may be defined by a sub-band, subcarrier, or a resource block.

As illustrated in FIG. 1, the base station 10 transmits control information or data to the terminal 20 by a downlink (DL), and receives control information or data from the terminal 20 by an uplink (UL). Both of the base station 10 and the terminal 20 are capable of performing transmission and reception with respect to the signal by performing beam forming. In addition, both of the base station 10 and the terminal 20 are capable of applying the communication of multiple input multiple output (MIMO) by DL or UL. In addition, both of the base station 10 and the terminal 20 may perform communication through a secondary cell (SCell) and a primary cell (PCell) according to carrier aggregation (CA).

The terminal 20 is a communication unit having a radio communication function of a smart phone, a mobile phone, a tablet, a wearable terminal, a communication module for machine-to-machine (M2M), and the like. As illustrated in FIG. 1, in the terminal 20, the control information or the data is received from the base station 10 by DL, and the control information or the data is transmitted to the base station 10 by UL, and thus, various communication services to be provided by the radio communication system are used.

Figure 2:
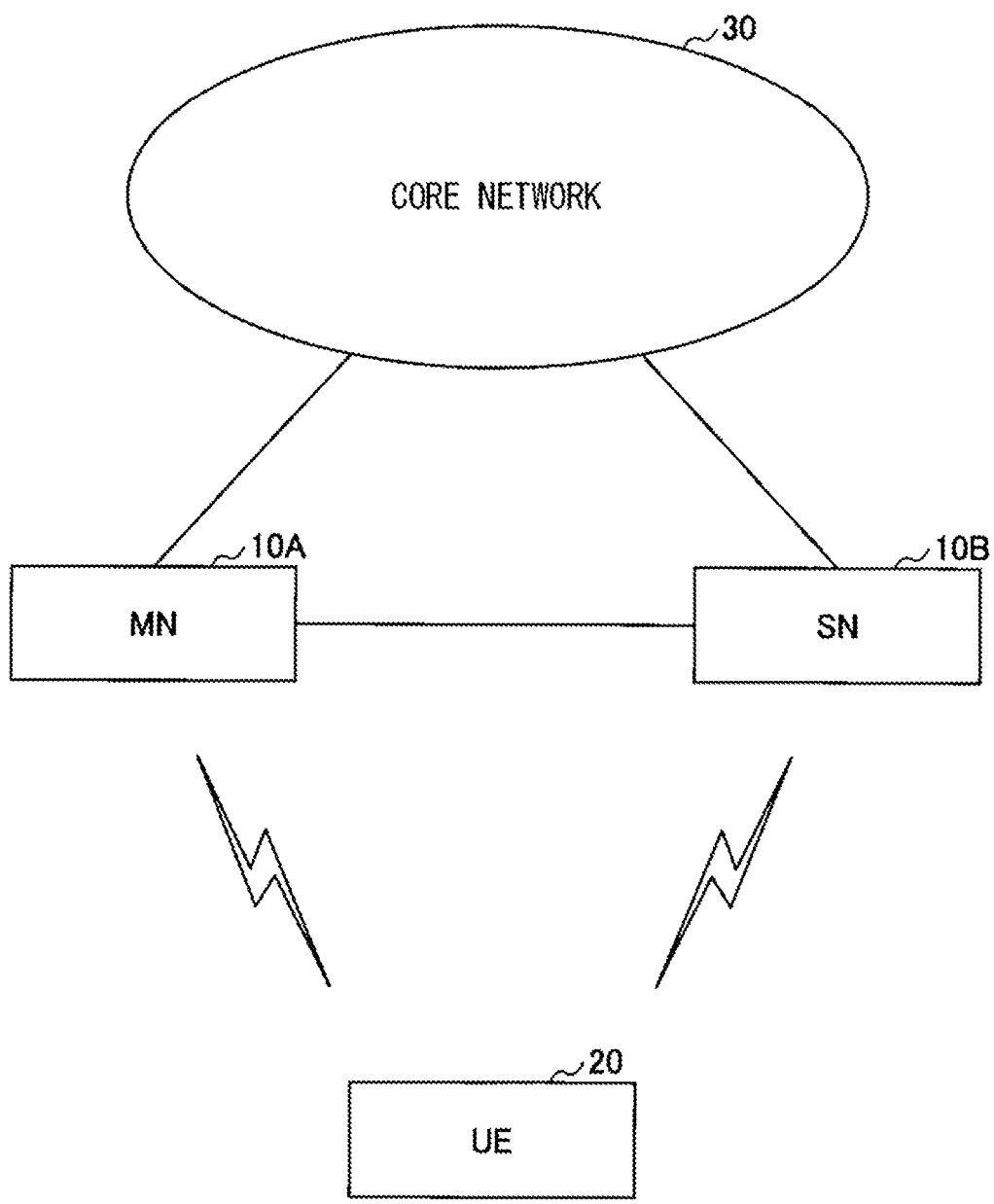
FIG. 2 is a diagram illustrating a configuration example (2) of the radio communication system in the embodiment of the invention.

FIG. 2 is a diagram illustrating a configuration example (2) of the radio communication system in the embodiment of the invention. FIG. 2 illustrates a configuration example of the radio communication system in a case where NR-dual connectivity (NR-DC) is executed. As illustrated in FIG. 2, a base station 10A that is a master node (MN) and a base station 10B that is a secondary node (SN) are provided. Each of the base station 10A and the base station 10B is connected to a core network 30. The terminal 20 performs communication with respect to both of the base station 10A and the base station 10B.

A cell group to be provided by the base station 10A that is MN is referred to as a master cell group (MCG), and a cell group to be provided by the base station 10B that is SN is referred to as a secondary cell group (SCG). The following operation may be performed by any configuration of FIG. 1 and FIG. 2.

Here, an object of NR-DSS, for example, is to enhance PDCCH for cross-carrier scheduling. As an example, a method for scheduling a physical downlink shared channel (PDSCH) or a physical uplink shared channel (PUSCH) of a primary cell or a primary secondary cell by PDCCH of a secondary cell has been discussed. In addition, as another example, a method for scheduling PDSCH of a plurality of cells by using single downlink control information (DCI), through PDCCH of a primary cell, a primary secondary cell, or a secondary cell has been discussed.

Figure 3:
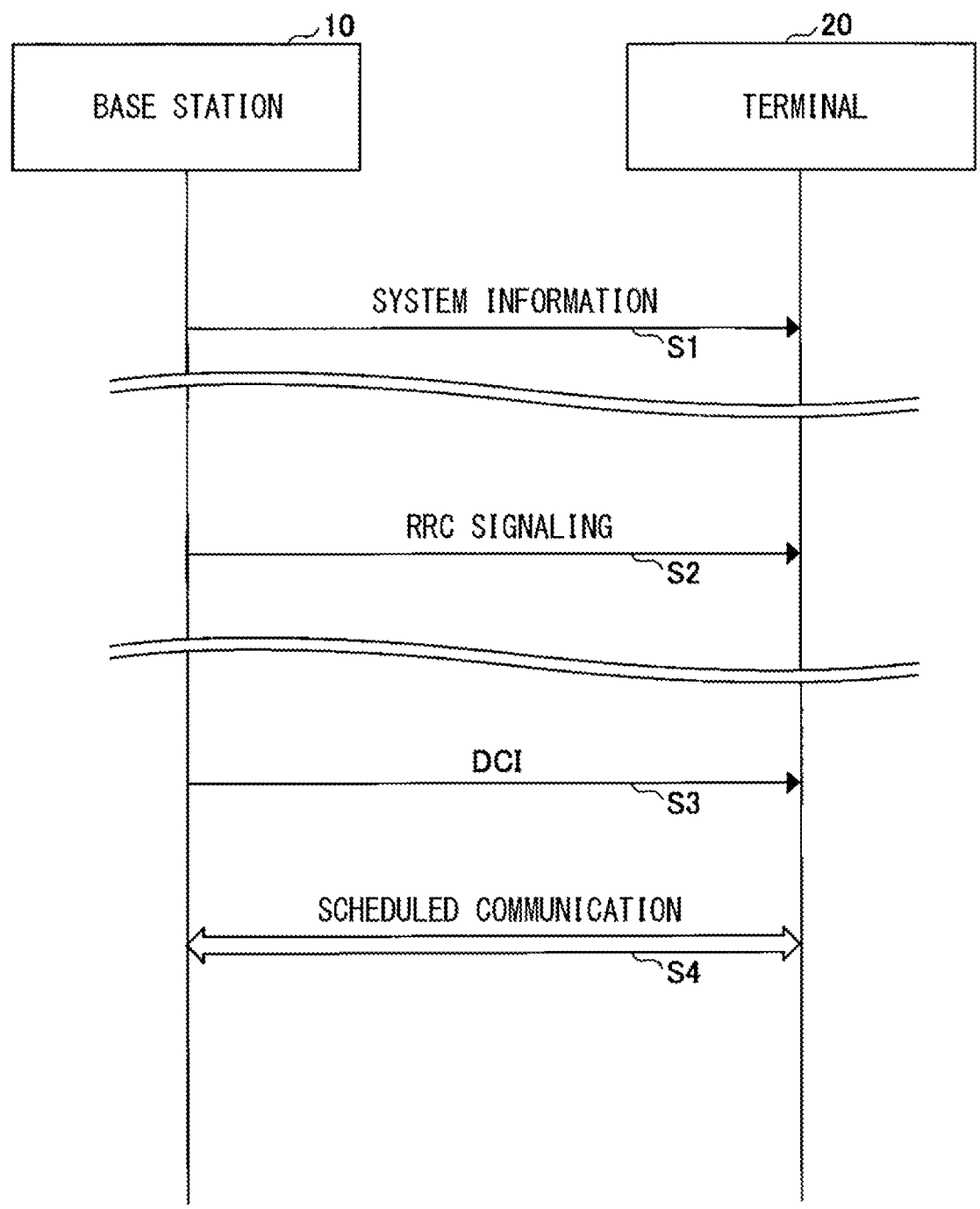
FIG. 3 is a sequence diagram illustrating a signaling example in the embodiment of the invention.

FIG. 3 is a sequence diagram illustrating a signaling example in the embodiment of the invention. As illustrated in FIG. 3, in step S1, the base station 10 may transmit system information including a specific information element (IE) to the terminal 20. Alternatively, in step S2, the base station 10 may individually transmit radio resource control (RRC) signaling including the specific IE to the terminal 20. Either of step S1 or step S2 may be executed, or an execution order may be reversed. The specific IE, for example, may be at least one of a system information block 1 (SIB1), another SIB, servingCellConfig, or the like. In step S3, the base station 10 schedules PDSCH or PUSCH of a plurality of cells or a single cell to the terminal 20 by DCI. In step S4, the terminal 20 executes scheduled communication with the base station 10.

Figure 4:
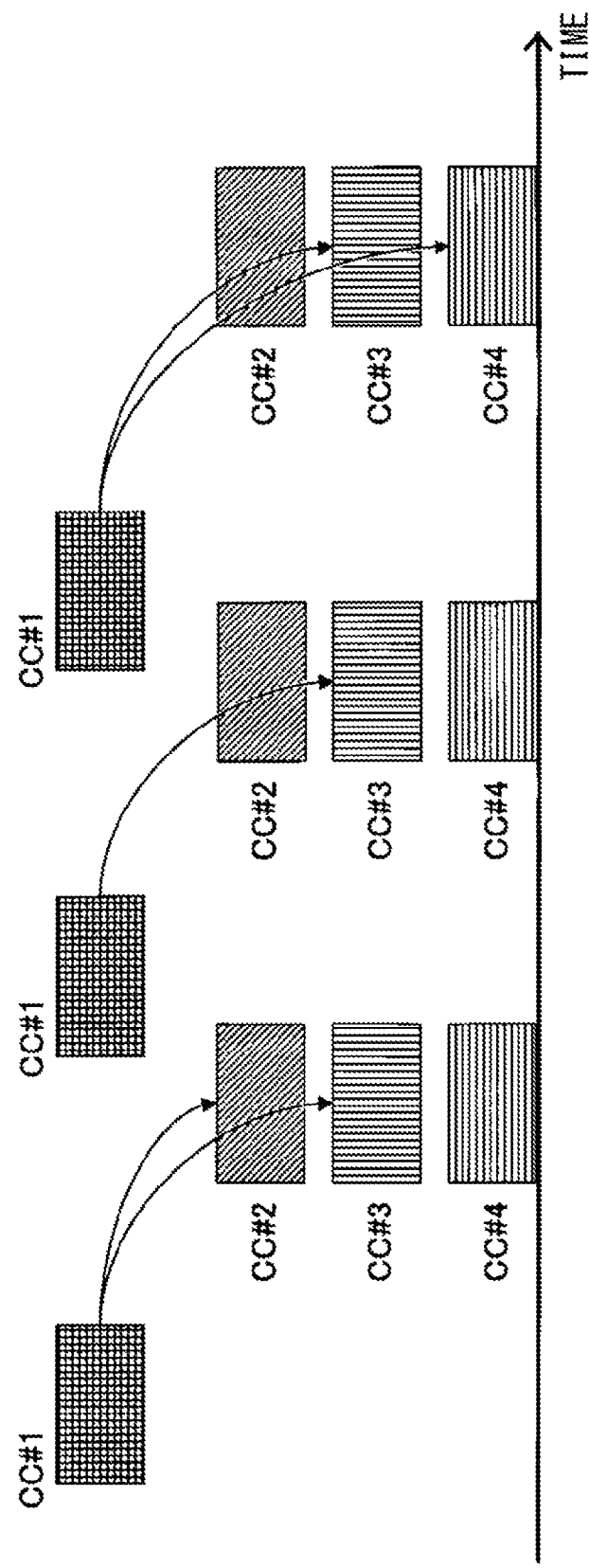
FIG. 4 is a diagram illustrating a cross-carrier scheduling example.

FIG. 4 is a diagram illustrating a cross-carrier scheduling example. As illustrated in FIG. 4, for example, PDSCHs of CC #2 and CC #3 are scheduled by cross-carrier scheduling by using DCI that is transmitted to the terminal 20 from the base station 10 through PDCCH of CC #1. This cross-carrier scheduling is an example of scheduling plurality of cells by using single control information. In addition, as illustrated in FIG. 4, for example, PDSCH of CC #3 is scheduled by cross-carrier scheduling by using DCI that is transmitted to the terminal 20 from the base station 10 through PDCCH of CC #1. This cross-carrier scheduling is an example of scheduling a single cell by using single control information. In addition, as illustrated in FIG. 4, for example, PDSCHs of CC #3 and CC #4 are scheduled by cross-carrier scheduling by using DCI that is transmitted to the terminal 20 from the base station 10 through PDCCH of CC #1. This cross-carrier scheduling is an example of scheduling plurality of cells by using single control information. Hereinafter, a scheduled PDSCH may be replaced with a scheduled PUSCH.

In the cross-carrier scheduling, a carrier indicator field (CIF) is used. CIF is used for designating a serving cell that is a scheduling target when PDCCH of the serving cell schedules a resource of the other serving cell. However, in the technology of the related art, there are following limitations represented by 1) to 3).

1) Primary cell (PCell) cannot be scheduled by cross-carrier scheduling. That is, the primary cell is always scheduled by its own PDCCH.

2) In a case where PDCCH is configured in a certain secondary cell (SCell), the secondary cell is always scheduled by its own PDCCH.

3) In a case where PDCCH is not configured in a certain secondary cell, PDSCH and PUSCH of the secondary cell are always scheduled by PDCCH in another serving cell.

Here, how the cross-carrier scheduling of PDSCH of the plurality of cells by the base station 10 and the terminal 20 as illustrated in FIG. 4 is supported by using the single DCI, has not been defined. In addition, whether to support a method of dynamically switching the scheduling of a single cell by using single control information and the scheduling of a plurality of cells by using single control information, has not been defined, and the supporting method has not been defined.

Therefore, in the radio communication system, a method of supporting the cross-carrier scheduling of plurality of cells by using single control information, is proposed. In addition, a method of dynamically switching the scheduling of a single cell by single control information and the scheduling of plurality of cells by single control information, is proposed.

Figure 5:
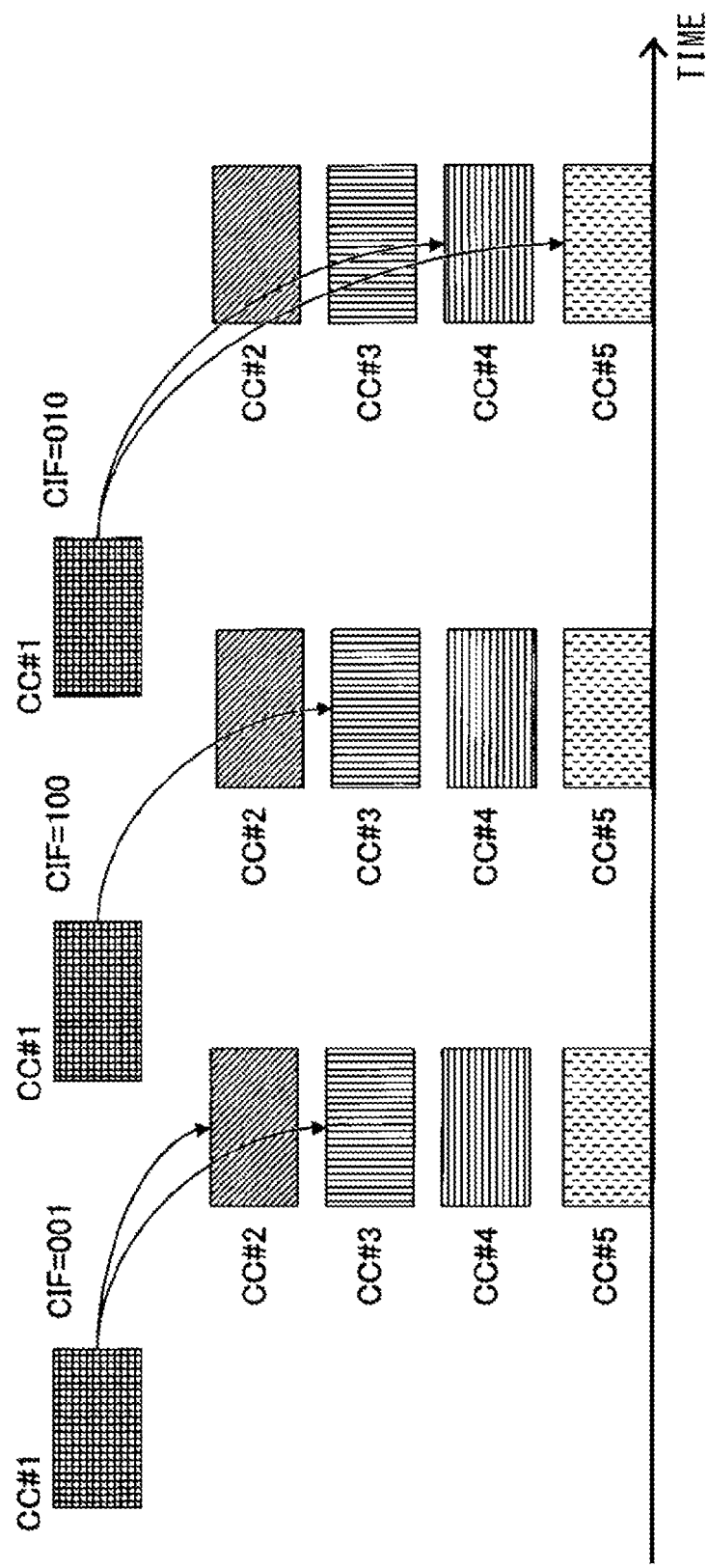
FIG. 5 is a diagram illustrating a scheduling example (1) in the embodiment of the invention.

FIG. 5 is a diagram illustrating a scheduling example (1) in the embodiment of the invention. The interpretation of CIF that is indicated by DCI, may be newly defined. Table 1 is a table showing an example of the interpretation of a CIF bit field for performing scheduling with respect to: CC #1 corresponding to a scheduling cell; and CC #2, CC #3, CC #4, and CC #5 corresponding to scheduled cells, as illustrated in FIG. 5. Hereinafter, a "cell", a "carrier", a "component carrier (CC)", or a "serving cell" may be replaced with each other, or may not be distinguished from each other.

TABLE 1

| CIF bit field | Scheduled carrier index(es) |
| --- | --- |
| 000 | CC#1 (i.e., Self-carrier scheduling) |
| 001 | CC#2, CC#3 |
| 010 | CC#4, CC#5 |
| 011 | CC#2 |
| 100 | CC#3 |
| 101 | CC#4 |
| 110 | CC#5 |
| 111 | Reserved |

As illustrated in FIG. 5, in a case where the CIF bit field is "001", the scheduled cell is CC #2 and CC #3. In addition, as illustrated in FIG. 5, in a case where the CIF bit field is "100", the scheduled cell is CC #3. In addition, as illustrated in FIG. 5, in a case where the CIF bit field is "010", the scheduled cell is CC #4 and CC #5. All of the scheduling examples illustrated in FIG. 5 are the cross-carrier scheduling.

In addition, as shown in Table 1, in a case where the CIF bit field is "000", a scheduled carrier is CC #1. Scheduling, in which a scheduling carrier and the scheduled carrier are the same, may be referred to as self-carrier scheduling. As described above, a part of the CIF bit field may correspond to the self-carrier scheduling, a plurality of scheduling target cells indicated by a part of the CIF bit field may include the scheduling carrier (for example, CC #1+CC #2 or the like). In addition, as shown in Table 1, in a case where the CIF bit field is "011", the scheduled cell is CC #2. In addition, as shown in Table 1, in a case where the CIF bit field is "101", the scheduled cell is CC #4. In addition, as shown in Table 1, in a case where the CIF bit field is "110", the scheduled cell is CC #5. Note that, as shown in Table 1, in a case where a value "111" of the CIF bit field is may be a reserved value, and in general, may not be used.

A higher layer may classify scheduled carriers to a group, and may signal information indicating a correspondence between: each codepoint of CIF as shown in Table 1; and the group. Note that, the group may be composed of two carriers, may be composed of one carrier, or may be composed of three or more carriers. A maximum bit length of CIF may be greater than or equal to 3 bits. By using CIF as described above, it is possible to implement dynamic switching between scheduling with respect to a single cell (for example, scheduling with respect to CC #x or CC #y) and scheduling with respect to a plurality of cells (for example, scheduling with respect to CC #x and CC #y). For example, the higher layer may be a radio resource control (RRC) layer, or may be a media access control (MAC) layer. For example, in step S1 or step S2 illustrated in FIG. 3, the base station 10 may signal information indicating a correspondence between: each of the codepoints of CIF as shown in Table 1; and the group, to the terminal 20. In addition, for example, in step S1 or step S2 illustrated in FIG. 3, the base station 10 may signal CIF and information related to the scheduled group, to the terminal 20.

FIG. 6 is a diagram illustrating an information element example (1) in the embodiment of the invention. FIG. 6 is an example of a parameter related to the cross-carrier scheduling in the higher layer. In FIG. 6, "other" is selected, and "schedulingCellId", that is, an index of the scheduling cell, and "cif-InSchedulingCell", that is, an index of the scheduled cell, are configured. In the maximum two cells, "schedulingCellId" and "cif-InSchedulingCell" may be the same value, respectively. For example, in step S1 or step S2 illustrated in FIG. 3, the base station 10 may signal the parameter illustrated in FIG. 6 to the terminal 20. A scheduling example in a case where the parameter illustrated in FIG. 6 is configured to CC #x and CC #y, is illustrated in FIG. 7.

Figure 7:
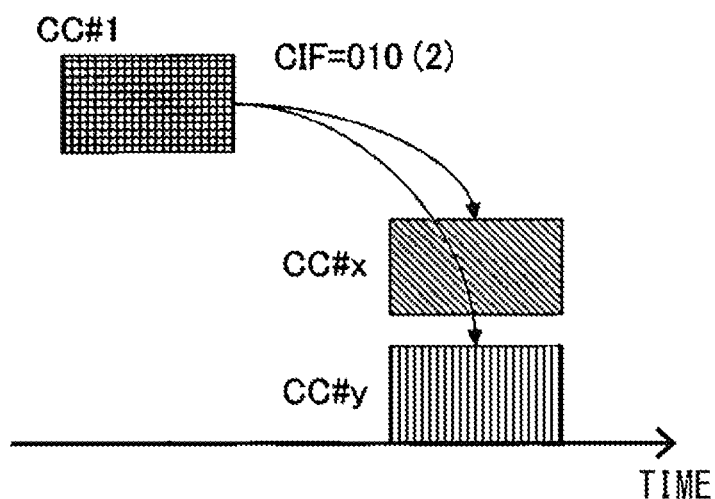
FIG. 7 is a diagram illustrating a scheduling example (2) in the embodiment of the invention.

FIG. 7 is a diagram illustrating a scheduling example (2) in the embodiment of the invention. The parameter "schedulingCellId" illustrated in FIG. 6 is "1", and thus, in FIG. 7, CC #1 is the scheduling cell. Further, the parameter "cif-InSchedulingCell" illustrated in FIG. 6 is "2", and thus, in a case where the CIF bit field is "2", that is, "010" in binary notation, as illustrated in FIG. 7, CC #x and CC #y are scheduled.

As illustrated in FIG. 6 and FIG. 7, in a case where CIF is associated with two scheduled cells when the terminal 20 receives DCI including the CIF in the scheduling cell, the two cells are scheduled. Here, by using CIF as described above, it is possible to implement the scheduling with respect to the plurality of cells (for example, the scheduling with respect to CC #x and CC #y). Note that, the number of cells in which "schedulingCellId" and "cif-InSchedulingCell" are the same value, respectively, may be greater than or equal to 3.

Figure 8:
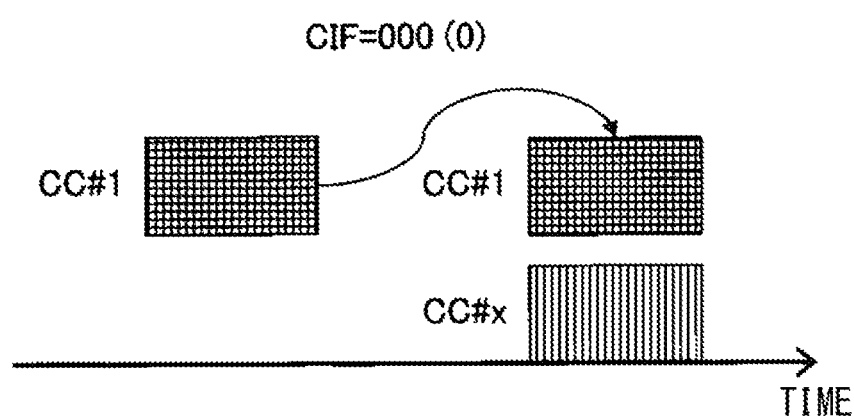
FIG. 8 is a diagram for illustrating a scheduling example (3) in the embodiment of the invention.

FIG. 8 is a diagram illustrating a scheduling example (3) in the embodiment of the invention. In a case where CIF is "000" as illustrated in FIG. 8 when the parameter illustrated in FIG. 6 is configured to CC #x, CC #1 that is the scheduling cell, may be scheduled.

Figure 9:
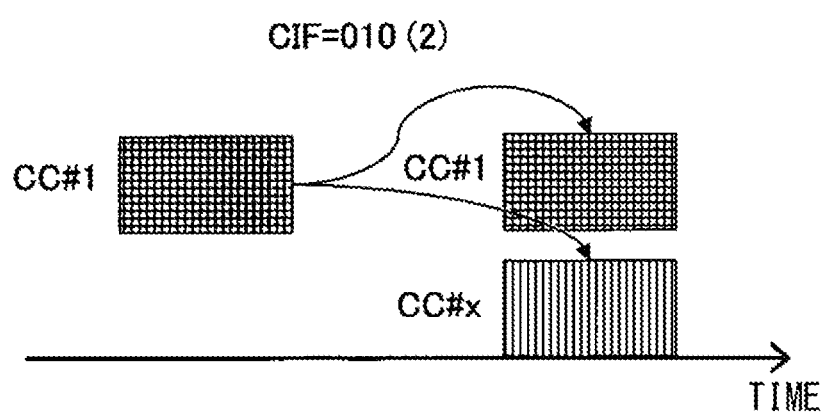
FIG. 9 is a diagram illustrating a scheduling example (4) in the embodiment of the invention.

FIG. 9 is a diagram illustrating a scheduling example (4) in the embodiment of the invention. In a case where CIF is greater than 0 when the parameter illustrated in FIG. 6 is configured to CC #x, CC #1 that is the scheduling cell, and the scheduled cell that is designated by "cif-InSchedulingCell", may be scheduled. For example, as illustrated in FIG. 9, in a case where CIF is "010", CC #1 and CC #x may be scheduled.

Note that, an operation for designating the cell that is a single scheduling target or a plurality of scheduling targets by CIF described above, may be applied to an operation for designating a bandwidth part (BWP) of each of a single scheduling target cell or a plurality of scheduling target cells, in a field for designating BWP. That is, the higher layer may classify a combination of BWPs of a single cell or a plurality of cells, as a group, and may signal information indicating a correspondence between each codepoint of the BWP bit field and the group. In addition, for example, the higher layer may signal information related to the BWP bit field and the group, to the terminal 20. In addition, each codepoint of the BWP bit field may designate the same BWP index in the plurality of cells. Table 2 is a table showing an example of the BWP bit field.

TABLE 2

| BWP bit field | BWP index(es) |
|---|---|
| 00 | BWP#0 of $1^{st}$ CC, BWP#0 of $2^{nd}$ CC |
| 01 | BWP#0 of $1^{st}$ CC, BWP#1 of $2^{nd}$ CC |
| 10 | BWP#1 of $1^{st}$ CC, BWP#0 of $2^{nd}$ CC |
| 11 | BWP#1 of $1^{st}$ CC, BWP#1 of $2^{nd}$ CC |

As shown in Table 2, a BWP bit field "00" corresponds to BWP #0 of the first CC and BWP #0 of the second CC. In addition, a BWP bit field "01" corresponds to BWP #0 of the first CC and BWP #1 of the second CC. In addition, a BWP bit field "10" corresponds to BWP #1 of the first CC and BWP #0 of the second CC. In addition, a BWP bit field "11" corresponds to BWP #1 of the first CC and BWP #1 of the second CC.

Table 3 is a table showing another example of the BWP bit field.

TABLE 3

| BWP bit field | BWP index(es) |
|---|---|
| 00 | BWP#0 of $1^{st}$ CC, BWP#0 of $2^{nd}$ CC |
| 01 | BWP#1 of $1^{st}$ CC, BWP#1 of $2^{nd}$ CC |
| 10 | BWP#2 of $1^{st}$ CC, BWP#2 of $2^{nd}$ CC |
| 11 | BWP#3 of $1^{st}$ CC, BWP#3 of $2^{nd}$ CC |

As shown in Table 3, a BWP bit field "00" corresponds to BWP #0 of the first CC and BWP #0 of the second CC. In addition, a BWP bit field "01" corresponds to BWP #1 of the first CC and BWP #1 of the second CC. In addition, a BWP bit field "10" corresponds to BWP #2 of the first CC and BWP #2 of the second CC. In addition, a BWP bit field "11" corresponds to BWP #3 of the first CC and BWP #3 of the second CC.

Note that, for example, the BWP index: may be "information for designating the serving cell (for example, a cell ID) and information indicating BWP-ID that is configured to the serving cell"; may be the "cell ID and information indicating DL-BWP-ID/UL-BWP-ID"; may be the "cell ID and information indicating firstActiveDownlinkBWP (for example, firstActiveDownlinkBWP-Id or a flag indicating firstActiveDownlinkBWP)"; or may be "initial downlink band-part". In addition, the number of BWP indexes associated with each of the BWP bit fields is not limited to 1 to 2 shown in Table 2 or Table 3, and may be any one of 1 to 1, 1 to 3, 1 to 4, and 1 to 5 or more. In addition, an association between the BWP bit field as shown in Table 2 or Table 3 and one or a plurality of BWP indexes, may be added, updated, or deleted by the higher layer.

Note that, new interpretation of CIF may be applied depending on the configuration of the higher layer. For example, whether to apply the new interpretation of CIF, may be determined based on the configuration of a search space of the scheduled cell and/or the scheduling cell. For example, in a case where a search space ID (searchSpaceId) is the same between a single scheduled cell and a scheduling cell, CIF may be interpreted as cross-carrier scheduling for scheduling a single carrier (cross single carrier scheduling). For example, in a case where the search space ID is the same between the plurality of scheduled cells and the scheduling cell, CIF may be interpreted as cross-carrier scheduling for scheduling a plurality of carriers (cross multiple carrier scheduling). As another example, the new interpretation of CIF may be applied depending on the configuration of a new higher layer. Note that, for example, in step S1 or step S2 illustrated in FIG. 3, the base station 10 may signal configuration according to the search space and the search space ID, to the terminal 20.

FIG. 10 is a diagram illustrating an information element example (2) in the embodiment of the invention. The higher layer may support an operation in which the self-carrier scheduling and the cross-carrier scheduling coexist. For example, in certain CC with a certain timing, PDSCH reception and/or PUSCH transmission may be scheduled only by either the self-carrier scheduling or the cross-carrier scheduling. That is, the terminal 20 may assume that the PDSCH reception and/or the PUSCH transmission in certain CC are scheduled by either the self-carrier scheduling or the cross-carrier scheduling.

FIG. 10 is an example of a parameter according to the cross-carrier scheduling in the higher layer. In FIG. 10, both of "own" and "other" are configured, and for example, "true" is configured in "cif-Presence", "CC #1" is configured in "schedulingCellId", and "2" is configured in "cif-InSchedulingCell". For example, in step S1 or step S2 illustrated in FIG. 3, the base station 10 may signal the parameters illustrated in FIG. 10 to the terminal 20. A scheduling example in which the parameters illustrated in FIG. 10 is configured to CC #x, is illustrated in FIG. 11 and FIG. 12.

Figure 11:
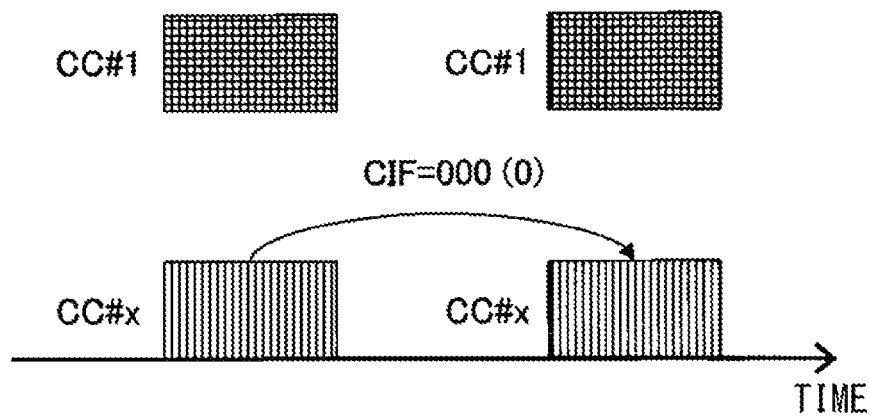
FIG. 11 is a diagram illustrating a scheduling example (5) in the embodiment of the invention.

FIG. 11 is a diagram illustrating a scheduling example (5) in the embodiment of the invention. In a case where the CIF bit field included in the control information that is transmitted on CC #x is "0", that is, "000" in binary notation, as illustrated in FIG. 11, CC #x may be scheduled by the self-carrier scheduling, by CC #x.

Figure 12:
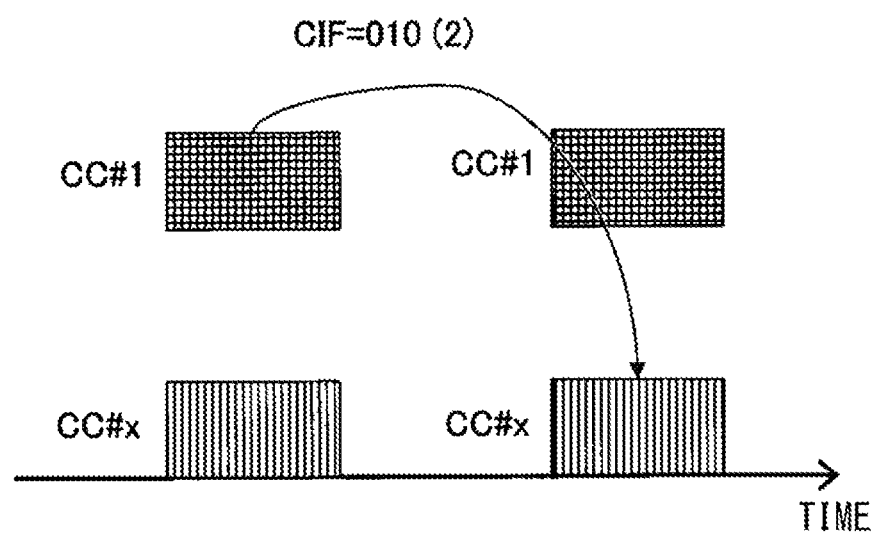
FIG. 12 is a diagram illustrating a scheduling example (6) in the embodiment of the invention.

FIG. 12 is a diagram illustrating a scheduling example (6) in the embodiment of the invention. In a case where the CIF bit field included in the control information that is transmitted on CC #1 is "2", that is, "010" in binary notation, as illustrated in FIG. 12, CC #x may be scheduled by the cross-carrier scheduling, by CC #1.

Note that, in the example described above, the "single DCI" may be replaced with "two or more DCIs".

By the example described above, the base station 10 can perform scheduling of a single cell or a plurality of cells, to the terminal 20 by the cross-carrier scheduling by using a single DCI. In addition, the base station 10 can designate BWP in a single cell or a plurality of cells, to the terminal 20 by a single DCI.

That is, in the radio communication system, it is possible to support the cross-carrier scheduling that schedules a single cell or a plurality of cells, by single control information.

(Functional Configuration)

Next, a functional configuration example of the base station 10 and the terminal 20 executing the processing and the operation that have been described will be described. The base station 10 and the terminal 20 have functions for implementing the example described above. Here, each of the base station 10 and the terminal 20 may have only a part of the functions in the example.

<Base Station 10>

Figure 13:
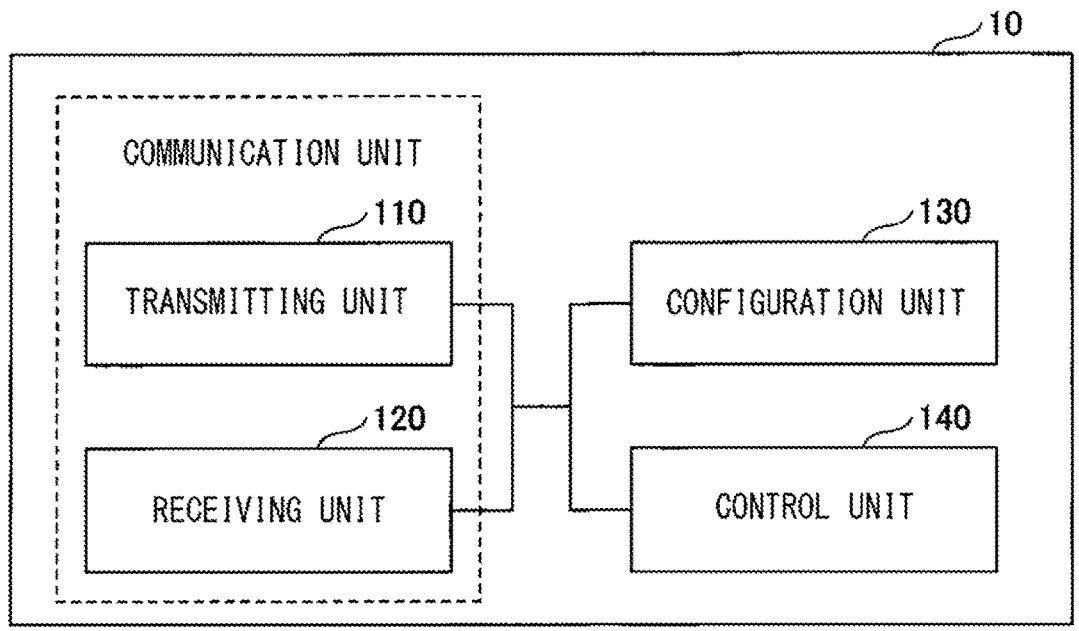
FIG. 13 is a diagram illustrating an example of a functional configuration of a base station 10 in the embodiment of the invention.

FIG. 13 is a diagram illustrating an example of a functional configuration of the base station 10 in the embodiment of the invention. As illustrated in FIG. 13, the base station 10 includes a transmitting unit 110, a receiving unit 120, a configuration unit 130, and a control unit 140. The functional configuration illustrated in FIG. 13 is merely an example. Any names may be used for functional segments and functional parts, insofar as the operation according to the embodiment of the invention can be executed.

The transmitting unit 110 has a function of generating a signal that is transmitted to the terminal 20 side and of transmitting the signal over the radio. In addition, the transmitting unit 110 transmits a message between network nodes to the other network node. The receiving unit 120 has a function of receiving various signals transmitted from the terminal 20 and of acquiring, for example, information of a higher layer from the received signals. In addition, the transmitting unit 110 has a function of transmitting NR-PSS, NR-SSS, NR-PBCH, a DL/UL control signal, or the like to the terminal 20. In addition, the receiving unit 120 receives the message between the network nodes from the other network node. The transmitting unit 110 and the receiving unit 120 may be combined as a communication unit.

The configuration unit 130 stores configuration information that is configured in advance, and various configuration information items that are transmitted to the terminal 20 in a storage unit, and as necessary, reads out the information from the storage unit. The contents of the configuration information, for example, are information necessary for a DSS technology and the cross-carrier scheduling, or the like.

As described in the example, the control unit 140 performs control according to the DSS technology. In addition, the control unit 140 performs control related to the cross-carrier scheduling. A functional part related to signal transmission in the control unit 140 may be included in the transmitting unit 110, and a functional part related to signal reception in the control unit 140 may be included in the receiving unit 120.

<Terminal 20>

Figure 14:
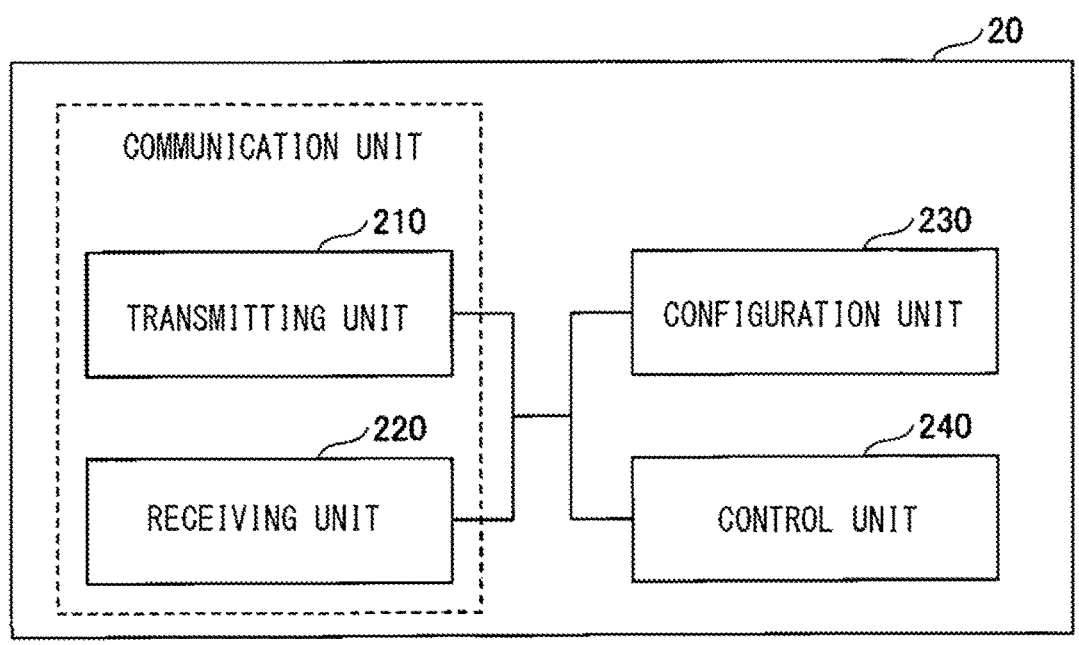
FIG. 14 is a diagram illustrating an example of a functional configuration of a terminal 20 in the embodiment of the invention.

FIG. 14 is a diagram illustrating an example of a functional configuration of the terminal 20 in the embodiment of the invention. As illustrated in FIG. 14, the terminal 20 includes a transmitting unit 210, a receiving unit 220, a configuration unit 230, and a control unit 240. The functional configuration illustrated in FIG. 14 is merely an example. Any names may be used for functional segments and functional parts, insofar as the operation according to the embodiment of the invention can be executed.

The transmitting unit 210 includes a function of preparing a transmission signal from transmission data and of transmitting the transmission signal over the radio. The receiving unit 220 receives various signals over the radio and acquires a signal of a higher layer from the received signal of a physical layer. In addition, the receiving unit 220 has a function of receiving NR-PSS, NR-SSS, NR-PBCH, a DL/UL/SL control signal, and the like, which are transmitted from the base station 10. In addition, for example, the transmitting unit 210 transmits a physical sidelink control channel (PSCCH), a physical sidelink shared channel (PSSCH), a physical sidelink discovery channel (PSDCH), a physical sidelink broadcast channel (PSBCH), and the like to the other terminal 20, as D2D communication, and the receiving unit 220 receives PSCCH, PSSCH, PSDCH, PSBCH, or the like from the other terminal 20. The transmitting unit 210 and the receiving unit 220 may be combined as a communication unit.

The configuration unit 230 stores various configuration information items received from the base station 10 or the terminal 20 by the receiving unit 220 in a storage unit, and as necessary, reads out the information from the storage unit. In addition, the configuration unit 230 also stores configuration information that is configured in advance. The contents of the configuration information, for example, are the information necessary for the DSS technology and the cross-carrier scheduling, or the like.

As described in the example, the control unit 240 performs the control related to the DSS technology in the terminal 20. In addition, the control unit 240 performs the control related to the cross-carrier scheduling. A functional part related to signal transmission in the control unit 240 may be included in the transmitting unit 210, and a functional part related to signal reception in the control unit 240 may be included in the receiving unit 220.

(Hardware Configuration)

The block diagrams (FIG. 13 and FIG. 14) used in the description of the embodiment described above illustrate the block of functional unit. Such function blocks (configuration parts) are implemented by at least one arbitrary combination of hardware and software. In addition, an implementing method of each of the function blocks is not particularly limited. That is, each of the function blocks may be implemented by using one apparatus that is physically or logically coupled, by connecting two or more apparatuses physically or logically separated directly or indirectly (for example, in a wired manner, over the radio, or the like) and by using such a plurality of apparatuses. The function block may be implemented by combining the one apparatus described above or the plurality of apparatuses described above with software.

The function includes determining, deciding, judging, calculating, computing, processing, deriving, investigating, looking up, ascertaining, receiving, transmitting, output, accessing, resolving, selecting, choosing, establishing, comparing, assuming, expecting, presuming, broadcasting, notifying, communicating, forwarding, configuring, reconfiguring, allocating (mapping), assigning, and the like, but is not limited thereto. For example, a function block (a configuration part) that functions transmission is referred to as the transmitting unit or a transmitter. As described above, the implementing method thereof is not particularly limited.

Figure 15:
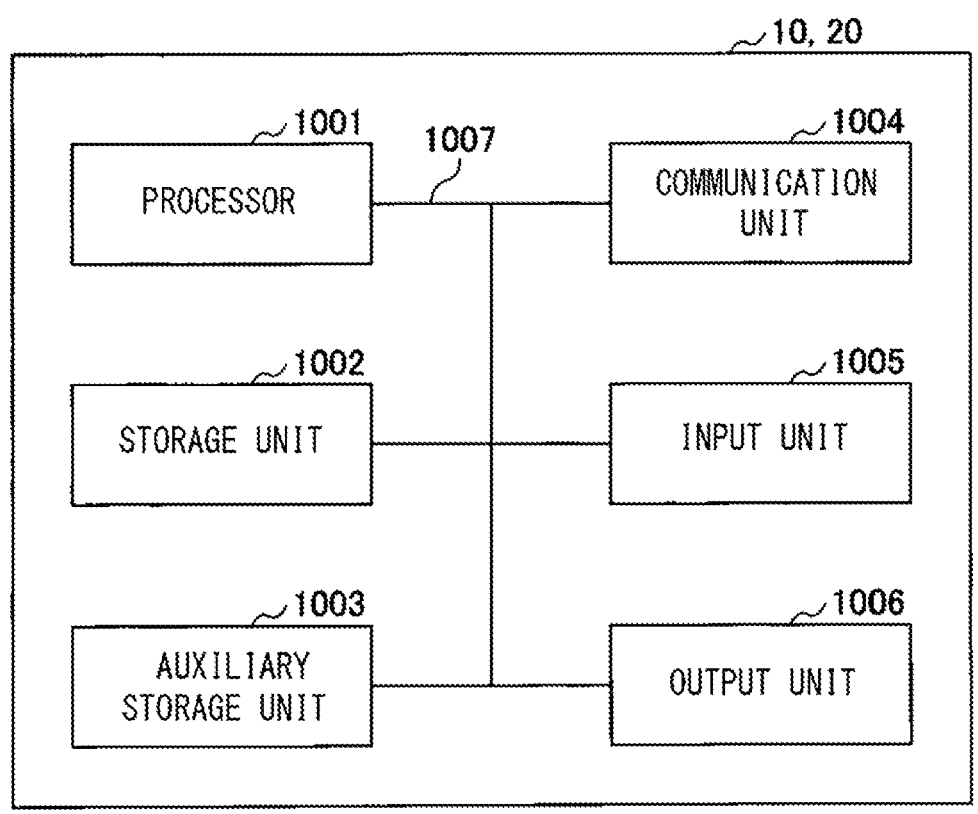
FIG. 15 is a diagram illustrating an example of a hardware configuration of the base station 10 or the terminal 20 in the embodiment of the invention.

For example, the base station 10, the terminal 20, and the like in one embodiment of this disclosure may function as a computer for performing the processing of a radio communication method of this disclosure. FIG. 15 is a diagram illustrating an example of a hardware configuration of the base station 10 and the terminal 20 according to one embodiment of this disclosure. The base station 10 and the terminal 20 described above may be physically configured as a computer apparatus including a processor 1001, a storage unit 1002, an auxiliary storage unit 1003, a communication unit 1004, an input unit 1005, an output unit 1006, a bus 1007, and the like.

Note that, in the following description, the word "apparatus" can be replaced with a circuit, a device, a unit, or the like. The hardware configuration of the base station 10 and the terminal 20 may be configured to include one or a plurality of apparatuses illustrated in the drawings, or may be configured not to include a part of the apparatuses.

Each function of the base station 10 and the terminal 20 is implemented by reading predetermined software (a program) on hardware such as the processor 1001 and the storage unit 1002 such that the processor 1001 performs an operation, and by controlling the communication of the communication unit 1004 or by controlling at least one of reading and writing of data in the storage unit 1002 and the auxiliary storage unit 1003.

The processor 1001, for example, controls the entire computer by operating an operating system. The processor 1001 may be configured by a central processing unit (CPU) including an interface with respect to the peripheral equipment, a control apparatus, an operation apparatus, a register, and the like. For example, the control unit 140, the control unit 240, or the like, described above, may be implemented by the processor 1001.

In addition, the processor 1001 reads out a program (a program code), a software module, data, and the like to the storage unit 1002 from at least one of the auxiliary storage unit 1003 and the communication unit 1004, and thus, executes various processes. A program for allowing a computer to execute at least a part of the operation described in the embodiment described above is used as the program. For example, the control unit 140 of the base station 10 illustrated in FIG. 13 may be implemented by a control program that is stored in the storage unit 1002 and is operated by the processor 1001. In addition, for example, the control unit 240 of the terminal 20 illustrated in FIG. 14 may be implemented by a control program that is stored in the storage unit 1002 and is operated by the processor 1001. It has been described that the various processings described above are executed by one processor 1001, but the processings may be simultaneously or sequentially executed by two or more processors 1001. The processor 1001 may be mounted on one or more chips. Note that, the program may be transmitted from a network through an electric communication line.

The storage unit 1002 is a computer readable recording medium, and for example, may be configured of at least one of a read only memory (ROM), an erasable programmable ROM (EPROM), an electrically erasable programmable ROM (EEPROM), a random access memory (RAM), and the like. The storage unit 1002 may be referred to as a register, a cache, a main memory (a main storage unit), and the like. The storage unit 1002 is capable of retaining a program (a program code), a software module, and the like, which can be executed in order to implement a communication method according to one embodiment of this disclosure.

The auxiliary storage unit 1003 is a computer readable recording medium, and for example, may be configured of at least one of an optical disk such as a compact disc ROM (CD-ROM), a hard disk drive, a flexible disk, a magnetooptical disk (for example, a compact disc, a digital versatile disk, and a Blu-ray (Registered Trademark) disk), a smart card, a flash memory (for example, a card, a stick, a key drive), a floppy (Registered Trademark) disk, a magnetic strip, and the like. The recording medium described above, for example, may be a database including at least one of the storage unit 1002 and the auxiliary storage unit 1003, a server, and other suitable media.

The communication unit 1004 is hardware for performing communication with respect to the computer through at least one of a wire network and a radio network (a transmitting and receiving device), and for example, is also referred to as a network device, a network controller, a network card, a communication module, and the like. The communication unit 1004, for example, may be configured by including a high frequency switch, a duplexer, a filter, a frequency synthesizer, and the like, in order to implement at least one of frequency division duplex (FDD) and time division duplex (TDD). For example, a transmitting and receiving antenna, an amplifier, a transmitting and receiving unit, a transmission path interface, and the like may be implemented by the communication unit 1004. In the transmitting and receiving unit, the transmitting unit and the receiving unit may be mounted by being physically or logically separated.

The input unit 1005 is an input device for receiving input from the outside (for example, a keyboard, a mouse, a microphone, a switch, a button, a sensor, and the like). The output unit 1006 is an output device for implementing output with respect to the outside (for example, a display, a speaker, an LED lamp, and the like). Note that, the input unit 1005 and the output unit 1006 may be integrally configured (for example, a touch panel).

In addition, each of the apparatuses such as the processor 1001 and the storage unit 1002 may be connected by the bus 1007 for performing communication with respect to information. The bus 1007 may be configured by using a single bus, or may be configured by using buses different for each of the apparatuses.

In addition, the base station 10 and the terminal 20 may be configured by including hardware such as a microprocessor, a digital signal processor (DSP), an application specific integrated circuit (ASIC), a programmable logic device (PLD), and a field programmable gate array (FPGA), and a part or all of the respective function blocks may be implemented by the hardware. For example, the processor 1001 may be mounted by using at least one of the hardware elements.

Summary of Embodiment

As described above, according to the embodiment of the invention, a terminal including: a receiving unit receiving first information for configuring scheduling and second information for executing scheduling, from a base station; and a control unit that identifies a plurality of scheduled carriers, based on the first information and the single second information, is provided.

By the configuration described above, the base station 10 can perform scheduling of a single cell or a plurality of cells, to the terminal 20 by the cross-carrier scheduling using a single DCI. That is, in the radio communication system, it is possible to support the cross-carrier scheduling that schedules a single cell or a plurality of cells by single control information.

The control unit may identify one or more carriers associated with a field for designating a carrier, the field being included in the second information, based on the first information. By the configuration described above, the base station 10 can perform scheduling of a single cell or a plurality of cells, to the terminal 20 by the cross-carrier scheduling using a single DCI, based on the configuration by the higher layer.

The control unit may identify the single carrier or the plurality of carriers based on the first information, the single carrier or the plurality of carriers correspond to the same index that is configured in the field for designating the carrier, and the field is included in the second information.

By the configuration described above, the base station 10 can perform scheduling of a single cell or a plurality of cells, to the terminal 20 by the cross-carrier scheduling using a single DCI, based on the configuration by the higher layer.

The control unit may identify: a carrier associated with the field for designating the carrier, the field being included in the second information; and a carrier for receiving the second information, based on the first information. By the configuration described above, the base station 10 can schedule a single cell or a plurality of cells, to the terminal 20 by the cross-carrier scheduling using a single DCI, based on the configuration by the higher layer.

The control unit may identify that a carrier having the same search space ID as that of the carrier for receiving the second information, is the single scheduled carrier or the plurality of scheduled carriers. By the configuration described above, the base station 10 can schedule a single cell or a plurality of cells, to the terminal 20 by the cross-carrier scheduling using the single DCI, based on the search space ID.

In addition, according to the embodiment of the invention, a communication method for allowing a terminal to execute: a receiving step of receiving first information for configuring scheduling and second information for executing scheduling from a base station; and a control step of identifying a single scheduled carrier or a plurality of scheduled carriers, based on the first information and the single second information, is provided.

By the configuration described above, the base station 10 can perform scheduling of a single cell or a plurality of cells, to the terminal 20 by the cross-carrier scheduling using a single DCI. That is, in the radio communication system, it is possible to support the cross-carrier scheduling that schedules a single cell or a plurality of cells by the single control information.

Supplement to Embodiment

As described above, the embodiment of the invention has been described, but the disclosed invention is not limited to the embodiment, and a person skilled in the art will understand various modification examples, correction examples, alternative examples, substitution examples, and the like. Specific numerical examples have been described in order to facilitate the understanding of the invention, but the numerical values are merely an example, and any appropriate values may be used, unless otherwise specified. The classification of the items in the above description is not essential to the invention, and the listings described in two or more items may be used by being combined, as necessary, or the listing described in one item may be applied to the listing described in another item (insofar as there is no contradiction). A boundary between the functional parts or the processing parts in the function block diagram does not necessarily correspond to a boundary between physical components. The operations of a plurality of functional parts may be physically performed by one component, or the operation of one functional part may be physically performed by a plurality of components. In a processing procedure described in the embodiment, a processing order may be changed, insofar as there is no contradiction. For the convenience of describing the processing, the base station 10 and the terminal 20 have been described by using a functional block diagram, but such an apparatus may be implemented by hardware, software, or a combination thereof. Each of software that is operated by a processor of the base station 10 according to the embodiment of the invention and software that is operated by a processor of the terminal 20 according to the embodiment of the invention may be retained in a random access memory (RAM), a flash memory, a read only memory (ROM), an EPROM, an EEPROM, a register, a hard disk (HDD), a removable disk, a CD-ROM, a database, a server, and other suitable storage media.

In addition, the indication of the information is not limited to the aspect/embodiment described in this disclosure, and may be performed by using other methods. For example, the indication of the information may be implemented by physical layer signaling (for example, downlink control information (DCI) and uplink control information (UCI)), higher layer signaling (for example, radio resource control (RRC) signaling, medium access control (MAC) signaling, broadcast information (a master information block (MIB)), a system information block (SIB)), other signals, or a combination thereof. In addition, the RRC signaling may be referred to as an RRC message, and for example, may be an RRC connection setup message, an RRC connection reconfiguration message, and the like.

Each aspect/embodiments described in this disclosure may be applied to a system using long term evolution (LTE), LTE-advanced (LTE-A), SUPER 3G, IMT-advanced, a 4th generation mobile communication system (4G), a 5th generation mobile communication system (5G), future radio access (FRA), new radio (NR), W-CDMA (Registered Trademark), GSM (Registered Trademark), CDMA2000, an ultra mobile broadband (UMB), IEEE 802.11 (Wi-Fi (Registered Trademark)), IEEE 802.16 (WiMAX (Registered Trademark)), IEEE 802.20, an ultra-wideband (UWB), Bluetooth (Registered Trademark), and other suitable systems and a next-generation system that is expanded on the basis thereof. In addition, a combination of a plurality of systems (for example, a combination of at least one of LTE and LTE-A and 5G, and the like) may be applied.

In the processing procedure, the sequence, the flowchart, and the like of each aspect/embodiment described herein, the order may be changed, insofar as there is no contradiction. For example, in the method described in this disclosure, the elements of various steps are presented by using an exemplary order, but are not limited to the presented specific order.

Herein, a specific operation that is performed by the base station 10 may be performed by an upper node, in accordance with a case. In a network provided with one or a plurality of network nodes including the base station 10, it is obvious that various operations that are performed in order for communication with respect to the terminal 20 can be performed by at least one of the base station 10 and network nodes other than the base station 10 (for example, MME, S-GW, or the like is considered as the network node, but the network node is not limited thereto). In the above description, a case is exemplified in which the number of network nodes other than the base station 10 is 1, but a plurality of other network nodes may be combined (for example, the MME and the S-GW).

The information, the signal, or the like described in this disclosure can be output to a lower layer (or the higher layer) from the higher layer (or the lower layer). The information, the signal, or the like may be input and output through a plurality of network nodes.

The input and output information or the like may be retained in a specific location (for example, a memory), or may be managed by using a management table. The information or the like that is input and output can be subjected to overwriting, updating, or editing. The output information or the like may be deleted. The input information or the like may be transmitted to the other apparatuses.

Judgment in this disclosure may be performed by a value represented by 1 bit (0 or 1), may be performed by a truth-value (Boolean: true or false), or may be performed by a numerical comparison (for example, a comparison with a predetermined value).

Regardless of whether the software is referred to as software, firmware, middleware, a microcode, and a hardware description language, or is referred to as other names, the software should be broadly interpreted to indicate a command, a command set, a code, a code segment, a program code, a program, a sub-program, a software module, an application, a software application, a software package, a routine, a sub-routine, an object, an executable file, an execution thread, a procedure, a function, and the like.

In addition, software, a command, information, and the like may be transmitted and received through a transmission medium. For example, in a case where the software is transmitted from a website, a server, or other remote sources by using at least one of a wire technology (a coaxial cable, an optical fiber cable, a twisted pair, a digital subscriber line (DSL), and the like) and a radio technology (an infrared ray, a microwave, and the like), at least one of the wire technology and the radio technology is included in the definition of the transmission medium.

The information, the signal, and the like described in this disclosure may be represented by using any of various different technologies. For example, the data, the command, the command, the information, the signal, the bit, the symbol, the chip, and the like that can be referred to through the entire description described above may be represented by a voltage, a current, an electromagnetic wave, a magnetic field or magnetic particles, an optical field or a photon, or an arbitrary combination thereof.

Note that, the terms described in this disclosure and the terms necessary for understanding this disclosure may be replaced with terms having the same or similar meaning. For example, at least one of the channel and the symbol may be a signal (signaling). In addition, the signal may be a message. In addition, a component carrier (CC) may be referred to as a carrier frequency, a cell, a frequency carrier, and the like.

The terms "system" and "network" used in this disclosure are interchangeably used.

In addition, the information, the parameter, and the like described in this disclosure may be represented by using an absolute value, may be represented by using a relative value from a predetermined value, or may be represented by using another corresponding information. For example, a radio resource may be indicated by an index.

The names used in the parameters described above are not a limited name in any respect. Further, expressions or the like using such parameters may be different from those explicitly disclosed in this disclosure. Various channels (for example, PUCCH, PDCCH, and the like) and information elements can be identified by any suitable name, and thus, various names that are allocated to such various channels and information elements are not a limited name in any respect.

In this disclosure, the terms "base station (BS)", "radio base station", "base station apparatus", "fixed station", "NodeB", "eNodeB (eNB)", "gNodeB (gNB)", "access point", "transmission point", "reception point", "transmission and reception point (transmission/reception point)", "cell", "sector", "cell group", "carrier", "component carrier", and the like can be interchangeably used. The base station may be referred to as a term such as a macrocell, a small cell, a femtocell, and a picocell.

The base station is capable of accommodating one or a plurality of (for example, three) cells. In a case where the base station accommodates the plurality of cells, the entire coverage area of the base station can be classified into a plurality of small areas, and each of the small areas is capable of providing a communication service by a base station subsystem (for example, an indoor type small base station (a remote radio head (RRH)). The term "cell" or "sector" indicates a part of the coverage area or the entire coverage area of at least one of the base station and the base station subsystem that perform the communication service in the coverage.

In this disclosure, the terms "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms, by a person skilled in the art.

At least one of the base station and the mobile station may be referred to as a transmitting apparatus, a receiving apparatus, a communication unit, and the like. Note that, at least one of the base station and the mobile station may be a device that is mounted on a mobile object, the mobile object itself, or the like. The mobile object may be a vehicle (for example, a car, an airplane, and the like), may be a mobile object that is moved in an unmanned state (for example, a drone, an autonomous driving car, and the like), or may be a (manned or unmanned) robot. Note that, at least one of the base station and the mobile station also includes an apparatus that is not necessarily moved in a communication operation. For example, at least one of the base station and the mobile station may be an internet of things (IoT) device such as a sensor.

In addition, the base station in this disclosure may be replaced with the user terminal. For example, each aspect/embodiment of this disclosure may be applied to a configuration in which communication between the base station and the user terminal is replaced with communication in a plurality of terminals (for example, may be referred to as device-to-device (D2D), vehicle-to-everything (V2X), and the like). In this case, the function of the base station 10 described above may be provided in the terminal 20. In addition, the words "up", "down", and the like may be replaced with words corresponding to the communication between the terminals (for example, "side"). For example, an up channel, a down channel, and the like may be replaced with a side channel.

Similarly, the user terminal in this disclosure may be replaced with the base station. In this case, the function of the user terminal described above may be provided in the base station.

The terms "determining" and "deciding (determining)" used in this disclosure may involve diverse operations. "Determining" and "deciding", for example, are capable of including "determining" and "deciding" with respect to judging, calculating, computing, processing, deriving, investigating, looking up (search, inquiry) (for example, looking up in a table, a database, or another data structure), and ascertaining, and the like. In addition, "determining" and "deciding" are capable of including "determining" and "deciding" with respect to receiving (for example, receiving information), transmitting (for example, transmitting information), input, output, and accessing (for example, accessing data in a memory), and the like. In addition, "determining" and "deciding" are capable of including "determining" and "deciding" with respect to resolving, selecting, choosing, establishing, comparing, and the like. That is, "determining" and "deciding" are capable of including "determining" and "deciding" with respect to any operation. In addition, "determining (deciding)" may be replaced with "assuming", "expecting", "considering", and the like.

The terms "connected" and "coupled", or any modification thereof indicate any direct or indirect connection or couple in two or more elements, and are capable of including a case where there are one or more intermediate elements between two elements that are "connected" or "coupled" to each other. The couple or connection between the elements may be physical couple or connection, may be logical couple or connection, or may be a combination thereof. For example, the "connection" may be replaced with "access". In the case of being used in this disclosure, it is possible to consider that two elements are "connected" or "coupled" to each other by using at least one of one or more electric wires, cables, and print electric connection, and as some non-limiting and non-inclusive examples, by using electromagnetic energy having a wavelength of a radio frequency domain, a microwave domain, and an optical (visible and invisible) domain, and the like.

The reference signal can also be abbreviated as RS, and may be referred to as pilot based on a standard to be applied.

The description "based on" that is used in this disclosure does not indicate "only based on", unless otherwise specified. In other words, the description "based on" indicates both "only based on" and "at least based on".

Any reference to elements using the designations "first," "second," and the like, used in this disclosure does not generally limit the amount or the order of such elements. Such designations can be used in this disclosure as a convenient method for discriminating two or more elements. Therefore, a reference to a first element and a second element does not indicate that only two elements can be adopted or the first element necessarily precedes the second element in any manner.

"Means" in the configuration of each of the apparatuses described above may be replaced with "unit", "circuit", "device", and the like.

In this disclosure, in a case where "include", "including", and the modification thereof are used, such terms are intended to be inclusive, as with the term "comprising". Further, the term "or" that is used in this disclosure is not intended to be exclusive-OR.

A radio frame may be configured of one or a plurality of frames in a time domain. Each of one or a plurality of frames in the time domain may be referred to as a subframe. The subframe may be further configured of one or a plurality of slots in the time domain. The subframe may be a fixed time length (for example, 1 ms) that does not depend on numerology.

The numerology may be a communication parameter to be applied to at least one of the transmission and the reception of a certain signal or channel. The numerology, for example, may indicate at least one of subcarrier spacing (SCS), a bandwidth, a symbol length, a cyclic prefix length, a transmission time interval (TTI), the number of symbols per TTI, a radio frame configuration, specific filtering processing that is performed by the transceiver in a frequency domain, specific windowing processing that is performed by the transceiver in a time domain, and the like.

The slot may be configured of one or a plurality of symbols (an orthogonal frequency division multiplexing (OFDM) symbol, a single carrier frequency division multiple access (SC-FDMA) symbol, and the like) in a time domain. The slot may be time unit based on the numerology.

The slot may include a plurality of mini slots. Each of the mini slots may be configured of one or a plurality of symbols in the time domain. In addition, the mini slot may be referred to as a subslot. The mini slot may be configured of symbols of which the number is less than that of the slot. PDSCH (or PUSCH) to be transmitted in time unit greater than the mini slot may be referred to as a PDSCH (or PUSCH) mapping type A. PDSCH (or PUSCH) to be transmitted by using the mini slot may be referred to as a PDSCH (or PUSCH) mapping type B.

All of the radio frame, the subframe, the slot, the mini slot, and the symbol represent time unit at the time of transmitting a signal. Other designations respectively corresponding to the radio frame, the subframe, the slot, the mini slot, and the symbol may be used.

For example, one subframe may be referred to as a transmission time interval (TTI), a plurality of consecutive subframes may be referred to as TTI, or one slot or one mini slot may be referred to as TTI. That is, at least one of the subframe and TTI may be a subframe (1 ms) in the conventional LTE, may be a period shorter than 1 ms (for example, 1 to 13 symbols), or may be a period longer than 1 ms. Note that, unit representing TTI may be referred to as a slot, a mini slot, and the like, but not a subframe.

Here, TTI, for example, indicates minimum time unit of scheduling in radio communication. For example, in an LTE system, the base station performs scheduling for allocating a radio resource (a frequency bandwidth, transmission power, and the like that can be used in each of the terminals 20) in TTI unit, with respect to each of the terminals 20. Note that, the definition of TTI is not limited thereto.

TTI may be transmission time unit of a data packet (a transport block), a code block, a codeword, and the like that are subjected to channel coding, or may be processing unit of scheduling, link adaptation, and the like. Note that, when TTI is applied, a time zone in which the transport block, the code block, the codeword, and the like are actually mapped (for example, the number of symbols) may be shorter than TTI.

Note that, in a case where one slot or one mini slot is referred to as TTI, one or more TTIs (that is, one or more slots or one or more mini slots) may be the minimum time unit of the scheduling. In addition, the number of slots (the number of mini slots) configuring the minimum time unit of the scheduling may be controlled.

TTI having a time length of 1 ms may be referred to as a normal TTI (TTI in LTE Rel.8-12), a normal TTI, a long TTI, a normal subframe, a normal subframe, a long subframe, a slot, and the like. TTI shorter than the normal TTI may be referred to as a shortened TTI, a short TTI, a partial TTI (or a fractional TTI), a shortened subframe, a short subframe, a mini slot, a subslot, a slot, and the like.

Note that, the long TTI (for example, the normal TTI, the subframe, and the like) may be replaced with TTI having a time length of greater than or equal to 1 ms, and the short TTI (for example, the shortened TTI and the like) may be replaced with TTI having a TTI length of less than a TTI length of the long TTI and greater than or equal to 1 ms.

The resource block (RB) is resource allocation unit of the time domain and the frequency domain, and may include one or a plurality of consecutive subcarriers in the frequency domain. The number of subcarriers included in RB may be the same regardless of the numerology, or for example, may be 12. The number of subcarriers included in RB may be decided based on the numerology.

In addition, the time domain of RB may include one or a plurality of symbols, or may be the length of one slot, one mini slot, one subframe, or one TTI. One TTI, one subframe, and the like may be respectively configured of one or a plurality of resource blocks.

Note that, one or a plurality of RBs may be referred to as a physical resource block (physical RB: PRB), a subcarrier group (SCG), a resource element group (REG), a PRB pair, a RB pair, and the like.

In addition, the resource block may be configured of one or a plurality of resource elements (RE). For example, one RE may be a radio resource domain of one subcarrier and one symbol.

A bandwidth part (BWP) (may be referred to as a part bandwidth or the like) may represent a subset of consecutive common resource blocks (common RBs) for certain numerology, in a certain carrier. Here, the common RB may be specified by an index of RB based on a common reference point of the carrier. PRB may be defined by a certain BWP, and may be numbered within BWP.

BWP may include BWP for UL (UL BWP) and BWP for DL (DL BWP). In UE, one or a plurality of BWPs may be configured within one carrier.

At least one of the configured BWPs may be active, and it may not be assumed that the UE transmits and receives a predetermined signal/channel out of the active BWP. Note that, the "cell", the "carrier", and the like in this disclosure may be replaced with "BWP".

The structure of the radio frame, the subframe, the slot, the mini slot, the symbol, and the like, described above, is merely an example. For example, the configuration of the number of subframes included in the radio frame, the number of slots per a subframe or a radio frame, the number of mini slots included in the slot, the number of symbols and RBs included in the slot or a mini slot, the number of subcarriers included in RB, the number of symbols in TTI, a symbol length, a cyclic prefix (CP) length, and the like can be variously changed.

In this disclosure, for example, in a case where articles such as a, an, and the are added by translation, this disclosure may include a case where nouns following the articles are in the plural.

In this disclosure, the term "A and B are different" may indicate "A and B are different from each other". Note that, the term may indicate "A and B are respectively different from C". The terms "separated", "coupled", and the like may be interpreted as with "being different".

Each aspect/embodiment described in this disclosure may be independently used, may be used by being combined, or may be used by being switched in accordance with execution. In addition, the indication of predetermined information (for example, the indication of "being X") is not limited to being performed explicitly, and may be performed implicitly (for example, the indication of the predetermined information is not performed).

Note that, in this disclosure, the RRC signaling or the system information is an example of the first information. DCI is an example of the second information. PDSCH or PUSCH is an example of the channel. CIF is an example of the field for designating the carrier.

As described above, this disclosure has been described in detail, but it is obvious for a person skilled in the art that this disclosure is not limited to the embodiment described in this disclosure. This disclosure can be implemented as corrected and changed modes without departing from the spirit and scope of this disclosure defined by the description of the claims. Therefore, the description in this disclosure is for illustrative purposes and does not have any limiting meaning with respect to this disclosure.

EXPLANATIONS OF LETTERS OR NUMERALS

10 BASE STATION
110 TRANSMITTING UNIT
120 RECEIVING UNIT
130 CONFIGURATION UNIT
140 CONTROL UNIT
20 TERMINAL
210 TRANSMITTING UNIT
220 RECEIVING UNIT
230 CONFIGURATION UNIT
240 CONTROL UNIT
30 CORE NETWORK
1001 PROCESSOR
1002 STORAGE UNIT
1003 AUXILIARY STORAGE UNIT
1004 COMMUNICATION UNIT
1005 INPUT UNIT
1006 OUTPUT UNIT

The invention claimed is:

1. A terminal comprising:
a receiver that receives, from a base station, first information indicating a codepoint of a field for designating a group comprising one or more cells to be scheduled, via an RRC (Radio Resource Control) layer;
a processor that determines, based on the first information, a bit field configuration,
wherein the receiver receives, from the base station, second information including the field to which the bit field configuration applies, and
wherein the processor identifies, based on the group indicated by the field and contained in the first information, one or more cells to be scheduled; and
a transmitter that transmits an uplink shared channel in a cell indicated by the second information.

2. The terminal according to claim 1, wherein the second information is downlink control information.

3. The terminal according to claim 1, wherein the receiver receives a downlink shared channel in a cell indicated by the second information.

4. The terminal according to claim 1, wherein the terminal dynamically switches, based on the second information, between a cell configured to receive a downlink shared channel and a cell configured to transmit an uplink shared channel.

5. A base station comprising:
a transmitter that transmits, to a terminal, first information indicating a codepoint of a field for designating a group comprising one or more cells to be scheduled, via an RRC (Radio Resource Control) layer;
a processor that determines, based on the first information, a bit field configuration,
wherein the transmitter transmits second information including the field to which the bit field configuration applies to the terminal, and
wherein the processor identifies, based on the group indicated by the field and contained in the first information, one or more cells to be scheduled; and a receiver that receives an uplink shared channel in a cell indicated by the second information.

6. A communication method performed by a terminal, the communication method comprising:

receiving, from the base station, first information indicating a codepoint of a field for designating a group comprising one or more cells to be scheduled via an RRC (Radio Resource Control) layer;

determining, based on the first information, a bit field configuration;

receiving, from the base station, second information including the field to which the bit field configuration applies;

identifying, based on the group indicated by the field and contained in the first information, one or more cells to be scheduled; and transmitting an uplink shared channel in a cell indicated by the second information.

* * * * *